United States Patent [19]

Bollian

[11] Patent Number: 4,744,502

[45] Date of Patent: May 17, 1988

[54] PROCESS FOR THE PRODUCTION OF TRI-METALLIC CONTACT RIVETS

[75] Inventor: Erwin Bollian, Rastatt, Fed. Rep. of Germany

[73] Assignee: Dr. Eugen Durrwachter Doduco Kg., Pforzheim, Fed. Rep. of Germany

[21] Appl. No.: 362,063

[22] Filed: Mar. 26, 1982

[30] Foreign Application Priority Data

Mar. 28, 1981 [DE] Fed. Rep. of Germany ....... 3112452

[51] Int. Cl.[4] .............................................. B23K 21/00

[52] U.S. Cl. .................................... 228/116; 228/3.1; 228/5.1

[58] Field of Search ................. 228/3.1, 5.1, 116, 265; 29/877, 882

[56] References Cited

U.S. PATENT DOCUMENTS

| | | | |
|---|---|---|---|
| 2,739,369 | 3/1956 | Cooney | 228/116 |
| 3,311,965 | 4/1967 | Gwyn, Jr. | 228/3.1 |
| 3,634,934 | 1/1972 | Fitzgerald | 228/3.1 |
| 4,073,425 | 2/1978 | Bollian | 228/3.1 |
| 4,232,812 | 11/1980 | Shibata | 228/3.1 |

FOREIGN PATENT DOCUMENTS

| | | | |
|---|---|---|---|
| 0062248 | 10/1982 | European Pat. Off. | 228/116 |
| 2063136 | 6/1981 | United Kingdom | 228/265 |

*Primary Examiner*—Kurt Rowan

*Attorney, Agent, or Firm*—Balogh, Osann, Kramer, Dvorak, Genova & Traub

[57] ABSTRACT

There is described an improved process for the production of tri-metallic contact rivets, in the course of which a cylindrical slug is formed with increased diameter under constant plastic deformation (upsetting) from three wire segments, and on this slug a head is then formed on one end by transformation.

4 Claims, 3 Drawing Sheets

PROCESS FOR THE PRODUCTION OF TRI-METALLIC CONTACT RIVETS

Figure 1:
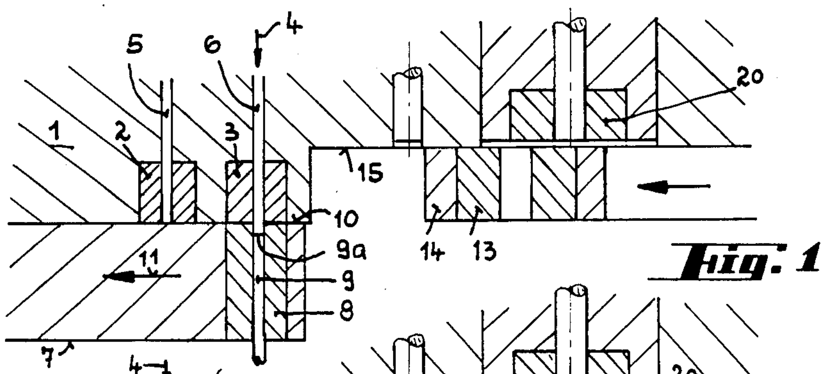

The present invention relates in particular to a process for the production of tri-metallic contact rivets by means of cold pressure welding operations as described hereinafter.

Such a process is known in the art, as disclosed, for example, in U.S. Pat. No. 4,232,812.

In the execution of the known process, three differently composed wire segments with congruent cross-sections are separated from a wire supply, and arranged with displacable supports aligned behind one another and between two stampers. The middle wire segment usually consists of copper, whereas both of the outer ones, especially the shorter wire segments, usually consist of silver.

In a first deformation step, only two of the wire segments are cold pressure welded together. To this end, one used in the known process two stampers which are movable to one another, and which are provided with conically opening bores. In the first bore, an anvil pin is found which is drawn back behind the aperture of the bore, so that the impact surfaces of both wire segments which are not yet to be cold pressure welded lie inside the bore and are impeded by its wall, in order to plastically deform by the following upset of the wire segments. In the upset caused by the approach of the matrices, there occurs a plastic deformation only in the area of the opening under the enlargement of the impact surfaces, by which the conical aperture area set a boundary for the radial flow of the wire material, and determine thereby the form of the slug according to this first upsetting process. These are cold pressure welded together through the enlargement of both the impact surfaces lying in the conical aperture area.

The matrix, which has already absorbed the already cold pressure welded wire segment, is now removed, so that the slug remains in place in the bore of the other matrix of the anvil pin. A third matrix, which exhibits a wider cylindrical bore than the first matrix, is brought into position in front of the slug, and the bore is just as wide as the upsetted end of the wire segments at the place of its greatest diameter. In the bore of the third matrix, there is found also an abutment in the form of an anvil pin. By means of the approach of the third matrix to the first matrix which contains the slug, the end of the slug which is protruding from the first matrix is again upsetted, so that it loses its conical form and, under contraction, changes over into a cylindrical form. In this transformation, no further cold pressure welding operation takes place.

Subsequently the third matrix, with the slug remaining inside, moves in front of a head-making matrix, and, through the approach of the third matrix to the head-making matrix, the protruding end of the slug is upsetted, and converted during further enlargement of the impulse surfaces to the final head of the contact rivet. Then the third matrix returns back, and the completed tri-metallic rivet is discharged through the forward movement of the anvil pin from the third matrix.

A disadvantage of the known process is that the three wire segments have to be aligned in three mountings behind one another, between the first and second matrices. For one thing, an exact alignment is difficult, for another, it is difficult to manage to remove the three mountings before the first deformation movement, without the wire segments being moved out from the forementioned flow.

A further essential disadvantage of the known process lies in this, that for the production of a tri-metallic rivet, a total of four additional steps are necessary for plastic deformation apart from the steps for cutting off and positioning the three wire segments, since between these four deformation steps, new deformatin tools have to be brought into position.

The task of the invention lies in this: to make available for mass production an especially suitable process, which uses fewer deformation steps than the known process.

This problem would be solved by a process with the characteristics as defined by the present invention. An essential characteristic of the invention is that a cylindrical slug with enlarged diameter is produced from the wire segments by means of cold pressure welding operation, and after this the rivet head is formed at one end of this slug, where the precious metal is found, through transformation. During the upsetting process, the three wire segments are completely thrust out of the guide bush, for the purpose of the formation of the cylindrical slug.

The enlargement of diameter which occurs through upsetting can be so selected that a flawless cold pressure welding operation is guaranteed. For the pairing of metals, silver/copper/silver, one may therefore select as one so chooses the velocity relationships of the abutment to the ejector pin given in claim 3. With a value of $v_w/v_s<0.25$, there occurs in the outer area of the impact surfaces of the wire segments only a progressively inadequate cold pressure welding, whereas with a value of $v_w/v_s$ exceeding 0.5 the cross-sectional increase is too slight for a flawless cold pressing.

At the beginning of the upsetting process, the abutment lies at the end of the guide bush. Between the abutment and the ejector pin, which projects from the other end into the guide bush, there are three wire segments which, with their ends turned towards each other and lying in pairs against one another, are adjacent to the two outer ends of the abutment. Subsequently, the ejector pin is pushed inside the guide bush with the velocity $v_s$, and at the same time the abutment is moved back from the bush with the lesser velocity of $v_w$. In the interior of the guide bush, an upsetting can not take place, since the wall of the guide bush opposes a an enlargement of the diameter of the wire segments. The upsetting takes place, in the space between the end of the guide bush and the abutment, which is turned towards this end. The increases of diameter progressively takes place along the wire segments during the expulsion of the wire segments out of the guide bush. The increase of cross section ensues according to the relationship, $$F_1 v_s = F_2 v_w, \qquad (I)$$

in which $F_1$ signifies the cross sectional surfaces of the wire segments before upsetting, and $F_2$ signifies the same after the upsetting.

In this, it is fundamentally insignificant whether, during the upsetting, the ejector pin moves against the abutment or the abutment moves against the ejector pin. What is important is that, during the upsetting, a space lying outside the guide bush is available, in which the enlargement of cross section which begins during upsetting can take place.

During the upsetting, the upsetted segment of the wires requires essentially no lateral direction. Preferably, an additional guide bush can be used, the narrow cross section of which is just $F_2$ or slightly larger. In this second guide bush, the abutment is displacably arranged. The second guide bush can further be employed in an advantageous way to hold the slug, while this is transferred to a header tool, as well as during the heading process itself.

The formation of the rivet head against the slug can take place, in the known process, through one or two deformation strokes. With the execution of the two deformation strokes, the end of the precious-metal covered slug remaining in a bush is pre-upsetted first of all in the free space in front of the bush, so that it can no longer snap off during the following second deformation stroke. The second deformation stroke is carried out with a press die (header), which possesses a cavity, the contour of which is congruent with the contour of the contact rivet head. If only one deformation stroke is carried out, then it is carried out by the header without pre-upsetting.

In contrast to the known process explained at the beginning, the process as specified by the invention requires for the formation of the rivet head not three deformation steps, but only one deformation step. As a result, machines which work according to the process as specified by the invention can produce significantly more cost effectively than those that produce according to the known process. A further advantage of the invention lies in this, that the cylindrical slug is produced by means of a continual flow process of the raw material, so that the metallurgical structure is much more favorable and homogeneous than in a tri-metallic contact rivet produced according to the known process.

It is further advantageous that—as quite opposed to the known process—the invention, by using a guide bush for the three loose wire segments, has no problem with the mounting and the adjustment of the wire segments before and during the upsetting.

It is, finally, also advantageous that, according to the invention, tri-metallic contact rivets can be produced with especially thin precious metal layers. For given dimensions of the finished contact rivet, the invention, because of the formation of the cylindrical slug, starts with a diameter, increased by upsetting, of thinner and suitably longer wire segments than the shaft of the finished tri-metallic contact rivet exhibits. If one starts from thinner wire segments than those which correspond to the shaft diameter of the finished tri-metallic contact rivets, then the volume portion of the inserted precious metals can be reduced. That is to say, it is not possible to cut off wire segments of any short length; if, therefore, these now can be selected, through the constant-remaining length of the precious metal-bearing wire segments, thinner than was the case previously, then a savings of precious metal from the reduction of cross section ensues. In accordance with the invention, one needs in a silver wire with the diameter D a minimum length of the wire segments of approximately 0.5 D to 0.8 D, where the lower value of 0.5 D applies for very thick wires and the higher value of 0.8 D holds for very thin wires. Shorter wire segments can hardly be handled and exhibit no smoothness which is adequate for the cutting surfaces suited for cold pressure welding operation.

One obtains the required large shaft diameter of the tri-metallic contact rivets by the upsetting of the wire segments, by means of which these cold pressure weld together at the same time. The length of the wire segments is shortened by the upsetting to the extent that the cross section of the wires increases. The length of precious metal segments of the slug formed by upsetting, and consequently the thickness of the layer of precious metal on the completely formed contact rivet head can thus be smaller than would be possible, if one were to start on the production of a tri-metallic contact rivet with the same exterior dimensions of wire segments, which already coincides in diameter with the diameter of the shaft of the tri-metallic contact rivet.

As an illustration of the possible savings of precious metals, the following numerical example is given: From a copper wire segment of 9 mm length and 3 mm diameter, and from two silver wire segments of 2 mm length and 3 mm diameter, a tri-metallic contact rivet can be produced according to a prior art cold pressure welding operation (for example, DE-OS No. 25 55 697), which exhibits the following typical dimensions:

(a) Shaft diameter: 3 mm
(b) Shaft length: 5 mm
(c) Head diameter: 6 mm
(d) Head elevation: 1.5 mm, of which
there consists of silver: 0.5 mm
and of copper: 1.0 mm According to the process of the invention, a tri-metallic contact rivet with congruent exterior measurements can be produced from a copper wire segment of 30 mm length and 1.64 mm diameter, as well as from two silver wire segments each of 1.5 mm length and 1.64 mm diameter. By thrusting, a slug of 3 mm diameter and 9.90 mm length develops, of which $2\times0.45$ mm is of silver. After the formation of the head of 6 mm diameter with continuous shaft length of 3.45 mm, there is produced on the head a layer of silver with an average thickness of only around 0.11 mm; the same savings occurs at the shaft end of the contact rivet, where an additional rivet head with a layer of silver is formed by means of riveting; the inserted quantity of silver, compared with the previously described tri-metallic contact rivet, amounts only to approximately 20%. By the saving of silver, the elevation of the rivet head by constant addition of copper can be reduced by around 0.39 mm. If necessary, this can be equalized through an increased copper supply.

The appended diagrams (FIG. 1 to FIG. 10) show schematically an example for the completion of the process as specified by the invention, by the depiction of the most important elements of the device, which are required for the execution of the process.

On a support (1) there are found parallel to one another two cutting bushes (2 and 3) with congruently inner width, so that a copper wire (5) and a silver wire (6) are led by conveyance equipment (not shown) from a wire supply in the direction of the arrow (4). The two wires have congruent diameters (FIG. 1). The free ends of both cutting bushes (2 and 3) lie on a level with an even outer surface (10) of the support (1), along which a slide (7) is displacable. The slide (7) has, parallel to the cutting bushes (2 and 3) a guide bush (8) passing through with the same inner diameter which the cutting bushes (2 and 3) exhibit. In the guide bush (8), an ejector pin (9) is displaceably arranged.

The production process begins with this, that the slide (7) is so displaced that the guide bush (8) is aligned with the cutting bush (FIG. 1); at the same time, the ejector pin (9) is so positioned, that its forward end (9*a*) occupies a distance from the upper surface (10) which is congruent with the length of the first segment of silver wire (6*a*). The silver wire is pushed forward, until it impinges on the end (9*a*) of the ejector pin, and then the slide (7) is moved in the direction of the arrow (11) (FIG. 1), so that the segment of silver wire remaining in the guide bush is sheared off.

Figure 2:
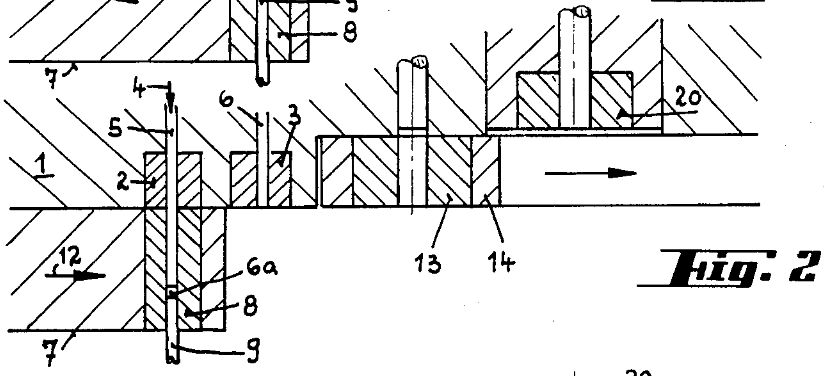

The slide (7) now proceeds, until the guide bush (8) is aligned with the cutter bush (2); at the same time, the ejector pin (9) is drawn back out, so that it is congruent with the length of the copper wire segment (5*a*) which is to be looped off (FIG. 2). Now the copper wire (5) is pushed forward in the direction of the arrow (4), until it impinges against the segment of silver wire (6*a*). Subsequently, the slide (7) is moved in the direction of the arrow (12) (FIG. 12), so that the segment of copper wire is sheared off.

Figure 3:
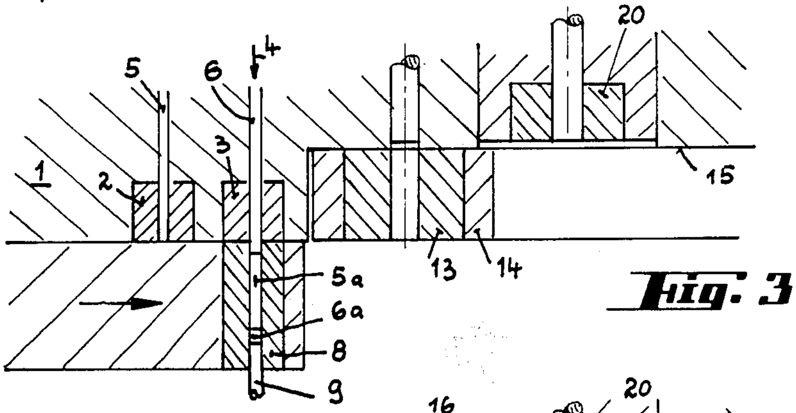

Through the displacement of the slide (7) in the direction of the arrow (12), this is brought along into the stream of the cutting bush (3), in which the silver wire (6) is fixed. The ejector pin (9) is again drawn back a small degree, the silver wire (6) is driven forward the same degree, and the segment of silver wire (6*b*) which protrudes from the cutting bush (3) is sheared off (FIG. 3). In the guide bush (8), there are found, now behind one another and impinging upon one another with their frontal surfaces, a first segment of silver wire (6*a*), a second segment of silver wire (6*b*), and between the two, a longer segment of copper wire (5*a*).

Figure 4:
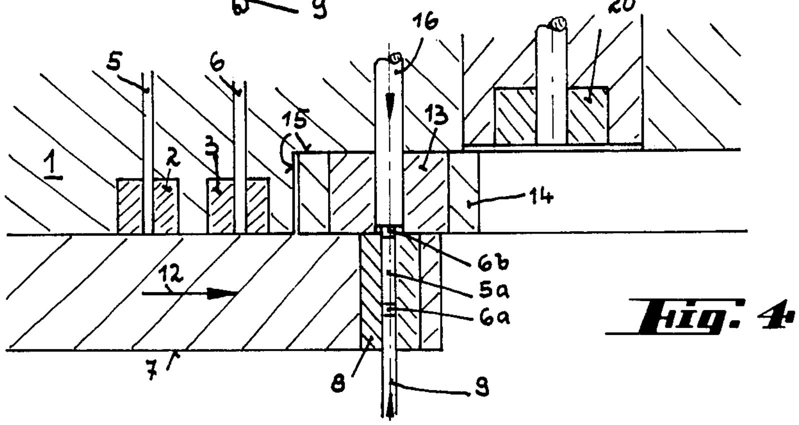

The slide (7) is now further displaced in the direction of the arrow (12), until the guide bush is aligned with a second guide bush (13), which is arranged passing through a second slide (14), which, parallel to the first slide (7), between the first slide (7) and the support, is displaceable in a graduated cavity (15) of the support (15) (FIG. 4). The second guide bush (13) has a thin cross section, which, for example, is greater by a factor of 3.5 than the thin cross section of the first guide bush (8). In the guide bush (13), a pestle (16) located on the support (1) is directed displaceable with horizontal end surfaces. This pestle (16) is first of all adjacent to the end of the guide bush (8), so that the three wire segments (5*a*, 5*b*, and 6*a*) are held free from play between the ejector pin (9) and the pestle (16).

Now the ejector pin (9) is thrust inside the guide bush (8) in the direction of the arrow (17), and simultaneously therewith, but with the velocity diminished by a factor of 3.5, the pestle (16) is moved back in the direction of the arrow (17). The ejector pin (9) therefore presses the wire segments 5*a*, 5*b*, and 6*a* against the slower pestle (16), which serves as an abutment. The result of this is that the cross section of the wire segments 5*a*, 5*b*, and 6*a* is expanded by the factor of 3.5; the upsetting takes place at the entrance of the material from the first guide bush (8) into the second guide bush (13). The wire segments 5*a* and 6*a*, as well as 5*a* and 6*b* thereupon cold pressure weld with one another and form a cylindrical slug (18). As soon as the forward end of the ejector pin (9) has reached the upper surface (10), its forward thrust ends and the pestle (16) is entirely withdrawn from the second guide bush (13). The slide (14) is now displaced in the direction of the arrow (19) (FIG. 5), until the guide bush (13) is aligned with an equally wide guide bush (20) in the support (1). The slug (18) is positioned in such a way between two displaceable pins (21 and 22 respectively) which are conducted into both these guide bushes (13 and 20), that it projects into the guide bush (20) (FIG. 6) at a length that coincides with the shaft length of the completed tri-metallic contact rivet.

Figure 7:
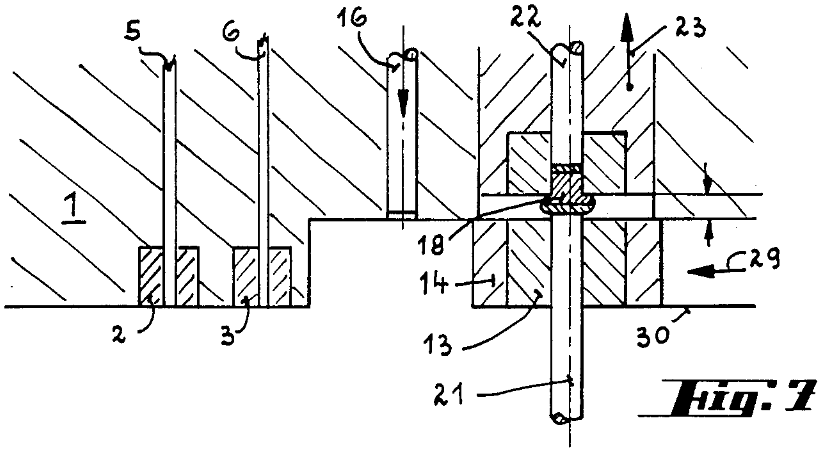

Subsequently, the guide bush (20) and the pin (22) are moved back by a specific, pre-selectable distance (L) in the direction of the arrow (23). Simultaneously with this, the pin (21) is moved in the same direction (23) (FIG. 7). In this manner there arises an open space (24) between the slide (14) and the guide bush (20), in which the later rivet head is pre-upsetted. This takes place through the forward thrust of the pin (21) in the direction of the arrow (23) against the stationary pin (22) as an abutment (FIG. 7). Through the pre-upset of the head it comes about that, during the following transformation process, through which the head is completely formed, the end of the slug (18) which protrudes out of the guide bush (20) does not break.

Figure 8:
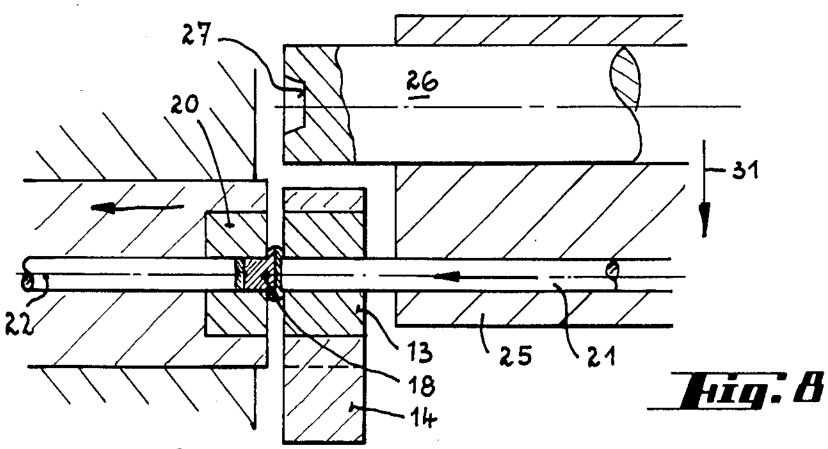

FIG. 8 also shows the moment of the pre-upsetting, in a line of sight turned 90 degrees (direction of arrow (29) in FIG. 7). After the pre-upsetting of the rivet head the pre-upsetting pin (21) is drawn back, and the slide (14) displaced in the direction of the arrow (29). At the same time, a tooling slide (25) is displaced in the diretion of the arrow (31), which is arranged parallel to the slide (14). In the tooling slides (25), the pre-upsetting pin (21) and a pestle serving as header (26) are located parallel to one another. Through the displacement, the header (26) and an aperture (30) lying between the header (26) and the support (1) arrive in the slide (14) in front of the guide bush (20) with the slug (18) inside. The header (26) possesses in its frontal surfaces—which are normally located at the height of the frontal surfaces of the guide bush (20) in which the exit position is located (FIG. 6 and 7)—a cavity (27), which exhibits the contour of the contact rivet head to be formed.

Figure 9:
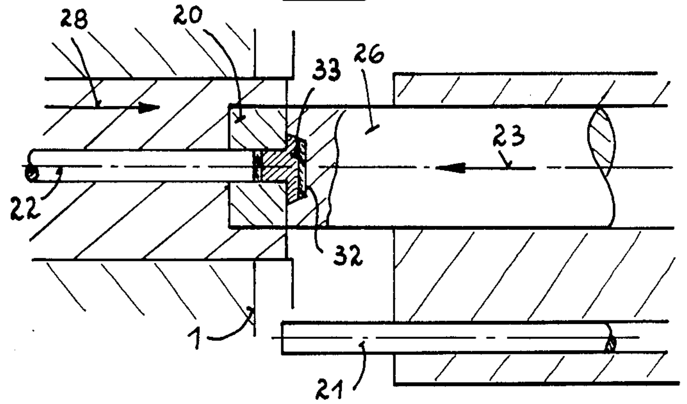
Figure 10:
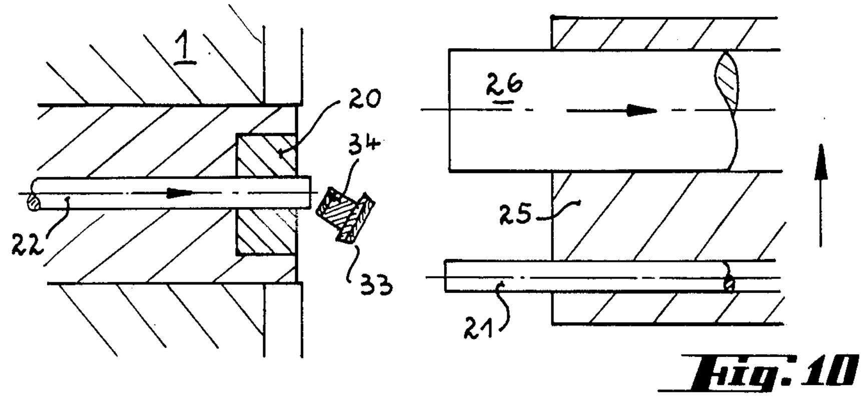

The guide bush (20) is now thrust in the direction of the arrow (28), together with the pin (22) fixed inside it, and strikes the pre-upsetted slug (18) against the stationary header (26), through which the head (32) receives its definitive shape (FIG. 9). Subsequently the tooling slides (25) are moved in the direction of the arrow (28); it withdraws from the support (1) and takes along with it the header (26) and the pre-upsetting pin (21), so that the completed tri-metallic contact rivet (33) is released. Subsequently, the pin (22) is thrust forward in the direction of the arrow (28) and expels the finished tri-metallic contact rivet (33), which until then has remained in its shaft (34) still in the guide bush (20) (FIG. 10).

Figure 5:
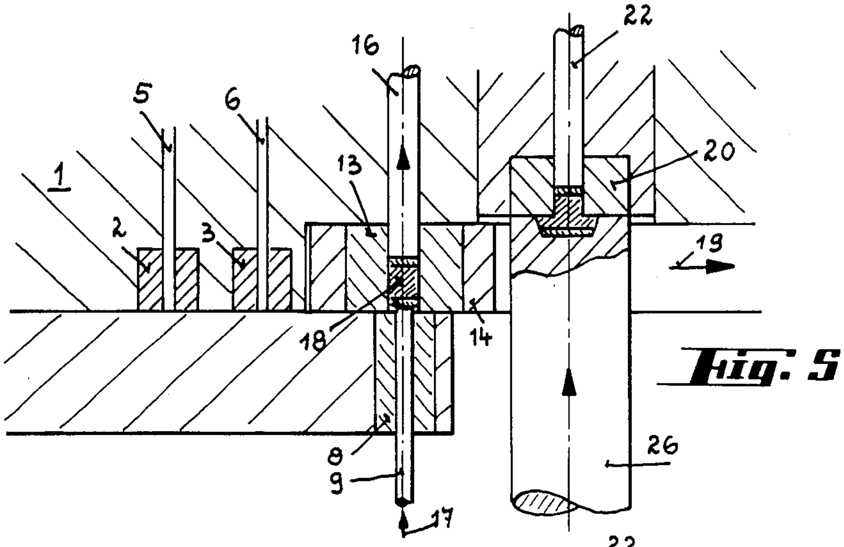
Figure 6:
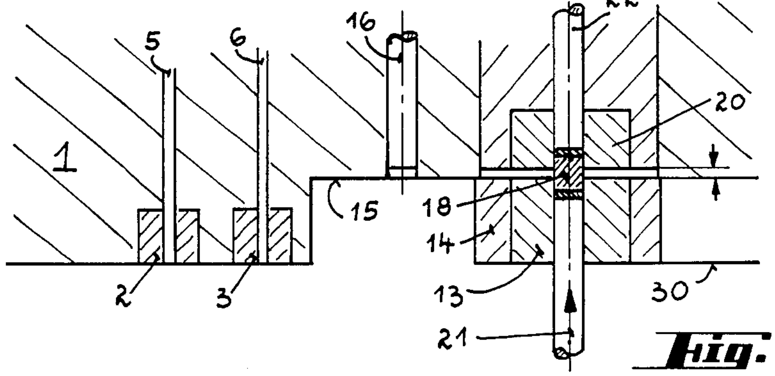

On the equipment there can run two processing cycles, parallel but temporally staggered, for the increase of the output. This is indicated in FIG. 5, where simultaneous with the upsetting of the wire segments (5*a*, 6*a*, and 6*b*) for the formation of a slug (18), the head is formed before the finished slug (18), along with the header (26).

I claim:

1. A process for the production of a tri-metallic contact rivet by cold pressure welding operation, comprising:

inserting three wire segments of congruous diameter but of different length and of different composition in a first guide bush which fits the same;

arranging the three wire segments, one behind another and impinging upon one another with their frontal surfaces, between an ejector pin which is displaceable lengthwise in the first guide bush, and an abutment with a cross-sectional area which is larger than the cross-sectional areas of the wire segments, which is arranged coaxially to the ejector pin outside the first guide bush and initially abutting the one end surface of the first guide bush;

pushing forward the ejector pin in the first guide bush and simultaneously withdrawing the abutment from the first guide bush coaxially with the forward movement of the ejector pin, so as to upset thereby the wire segments in accordance with decreasing distance between the adjacent surfaces of the ejector pin and of the abutment, and form a blank therefrom;

during the upsetting, leading the upset blank of the three wire segments into a second guide bush in which the abutment is displaceable;

the velocity of the abutment relative to the first guide bush being smaller than the velocity of the ejector pin relative to the first guide bush, and both velocities standing in constant ration to one another, and forming the rivet head by cold press working at one end of the blank formed from the upset three wire segments;

the cross-sectional area of the second guide bush being proportional to the cross-sectional area of the first guide bush, as the velocity of the ejector pin to the velocity of the abutment.

2. A process according to claim 1, wherein the ratio of velocities of the ejector pin and the abutment is adjustable.

3. A process according to claim 1 or 2, wherein the ratio of velocities of the ejector pin (Vs) and of the abutment (Vw) may be selected, through the use of wire segments of copper on one side and silver on the other, between $$Vw/Vs=0.25 \text{ and } Vw/Vs=0.5.$$

4. A process according to claim 1 or 2, wherein the ratio of the velocities of the ejector pin (Vs) and of the abutment (Vw) may be selected, through the use of wire segments of copper on one side and silver on the other, between $$Vw/Vs=0.3 \text{ and } Vw/Vs=0.4.$$

* * * * *